United States Patent
Basso et al.

(10) Patent No.: US 11,064,136 B2
(45) Date of Patent: *Jul. 13, 2021

(54) SYSTEM AND METHOD FOR CREATING AND MANIPULATING SYNTHETIC ENVIRONMENTS

(71) Applicant: AT&T Intellectual Property I, L.P., Atlanta, GA (US)

(72) Inventors: Andrea Basso, Marlboro, NJ (US); Lee Begeja, Gillette, NJ (US); David C. Gibbon, Lincroft, NJ (US); Zhu Liu, Marlboro, NJ (US); Bernard S. Renger, New Providence, NJ (US); Behzad Shahraray, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,622

(22) Filed: Aug. 5, 2019

(65) Prior Publication Data
US 2019/0356865 A1  Nov. 21, 2019

Related U.S. Application Data

(63) Continuation of application No. 13/600,652, filed on Aug. 31, 2012, now Pat. No. 10,375,320, which is a
(Continued)

(51) Int. Cl.
*G06F 3/048* (2013.01)
*H04N 5/265* (2006.01)
(Continued)

(52) U.S. Cl.
CPC ............ *H04N 5/265* (2013.01); *G09F 9/35* (2013.01); *G09F 19/22* (2013.01); *G09F 27/00* (2013.01);
(Continued)

(58) Field of Classification Search
CPC .... H04N 5/265; H04N 7/163; H04N 21/4131; H04N 21/41415; H04N 21/42203;
(Continued)

(56) References Cited

U.S. PATENT DOCUMENTS

5,590,062 A   12/1996 Nagamitsu
7,053,915 B1 * 5/2006 Jung ...................... G10H 1/368
                                                        345/629
(Continued)

*Primary Examiner* — Anil N Kumar (57) ABSTRACT

Disclosed herein are systems, computer-implemented methods, and tangible computer-readable media for synthesizing a virtual window. The method includes receiving an environment feed, selecting video elements of the environment feed, displaying the selected video elements on a virtual window in a window casing, selecting non-video elements of the environment feed, and outputting the selected non-video elements coordinated with the displayed video elements. Environment feeds can include synthetic and natural elements. The method can further toggle the virtual window between displaying the selected elements and being transparent. The method can track user motion and adapt the displayed selected elements on the virtual window based on the tracked user motion. The method can further detect a user in close proximity to the virtual window, receive an interaction from the detected user, and adapt the displayed selected elements on the virtual window based on the received interaction.

20 Claims, 10 Drawing Sheets

Related U.S. Application Data continuation of application No. 12/343,114, filed on Dec. 23, 2008, now Pat. No. 8,259,178.

(51) Int. Cl.

| | | |
|---|---|---|
| *G09F 9/35* | (2006.01) | |
| *G09F 19/22* | (2006.01) | |
| *G11B 27/10* | (2006.01) | |
| *G11B 27/34* | (2006.01) | |
| *H04N 7/16* | (2011.01) | |
| *H04N 21/41* | (2011.01) | |
| *H04N 21/414* | (2011.01) | |
| *H04N 21/422* | (2011.01) | |
| *H04N 21/431* | (2011.01) | |
| *H04N 21/442* | (2011.01) | |
| *H04N 21/4545* | (2011.01) | |
| *G09F 27/00* | (2006.01) | |
| *G11B 27/034* | (2006.01) | |
| *H04N 21/4223* | (2011.01) | |
| *H04N 21/45* | (2011.01) | |

(52) U.S. Cl.
CPC .......... *G11B 27/034* (2013.01); *G11B 27/105* (2013.01); *G11B 27/34* (2013.01); *H04N 7/163* (2013.01); *H04N 21/4131* (2013.01); *H04N 21/41415* (2013.01); *H04N 21/4223* (2013.01); *H04N 21/42203* (2013.01); *H04N 21/4312* (2013.01); *H04N 21/4314* (2013.01); *H04N 21/44218* (2013.01); *H04N 21/4532* (2013.01); *H04N 21/45452* (2013.01)

(58) Field of Classification Search
CPC .......... H04N 21/4223; H04N 21/4312; H04N 21/4314; H04N 21/44218; H04N 21/4532; H04N 21/45452; G09F 9/35; G09F 19/22; G09F 27/00; G11B 27/034; G11B 27/34; G11B 27/105
USPC ........................................................ 715/757
See application file for complete search history.

(56) References Cited

U.S. PATENT DOCUMENTS

| | | | |
|---|---|---|---|
| 7,467,356 B2* | 12/2008 | Gettman | G06F 3/04815 |
| | | | 715/850 |
| 2001/0001303 A1* | 5/2001 | Ohsuga | A63F 13/28 |
| | | | 482/5 |
| 2001/0033344 A1 | 10/2001 | Grein et al. | |
| 2003/0063133 A1 | 4/2003 | Foote et al. | |
| 2005/0049022 A1 | 3/2005 | Mullen | |
| 2006/0218042 A1* | 9/2006 | Cruz | G06Q 50/12 |
| | | | 705/15 |
| 2008/0163052 A1 | 7/2008 | George et al. | |
| 2008/0246693 A1 | 10/2008 | Hailpern et al. | |
| 2008/0311983 A1 | 12/2008 | Koempel et al. | |
| 2009/0051699 A1* | 2/2009 | Posa | H04N 13/368 |
| | | | 345/619 |
| 2009/0063983 A1 | 3/2009 | Amidon et al. | |
| 2009/0066690 A1 | 3/2009 | Harrison | |
| 2009/0076894 A1 | 3/2009 | Bates et al. | |
| 2009/0165140 A1 | 6/2009 | Robinson et al. | |
| 2009/0276802 A1 | 11/2009 | Amento et al. | |
| 2010/0091036 A1 | 4/2010 | Wright et al. | |

* cited by examiner

SYSTEM AND METHOD FOR CREATING AND MANIPULATING SYNTHETIC ENVIRONMENTS

PRIORITY INFORMATION

The present application is a continuation of U.S. patent application Ser. No. 13/600,652, filed Aug. 31, 2012, which is a continuation of U.S. patent application Ser. No. 12/343,114, filed Dec. 23, 2008, the contents of which are incorporated herein in their entirety.

BACKGROUND OF THE INVENTION

1. Field of the Invention

The present invention relates to synthetic environments and more specifically to virtual windows to a synthetic environment.

2. Introduction

People living in high density population centers often live in houses that have few windows or have windows with views that are not very aesthetically appealing. Offices in such areas are frequently part of a high-rise building where window offices are rare. People in such conditions can go days on end without seeing sunlight except as they commute to and from work. Human beings feel better when they can see the environment around them, including the sun, nature, the weather, clouds, and so forth. Certain people get depressed or feel miserable without some contact with the outside. Moving away from a home or job to the country side may not be an option. This and other situations exist where people want to see something other than their actual environmental surroundings or where people want others to see something other than what is actually there. Accordingly, what is needed in the art is a way to make windows that show something other than what is in fact on the other side of a wall.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for synthesizing a virtual window. The method includes receiving an environment feed, selecting video elements of the environment feed, displaying the selected video elements on a virtual window in a window casing, selecting non-video elements of the environment feed, and outputting the selected non-video elements coordinated with the displayed video elements. Environment feeds can include synthetic and natural elements. The method can further toggle the virtual window between displaying the selected elements and being transparent. The method can track user motion and adapt the displayed selected elements on the virtual window based on the tracked user motion. The method can alter one or more element of the environment feed over time. The method can further detect a user in close proximity to the virtual window, receive an interaction from the detected user, and adapt the displayed selected elements on the virtual window based on the received interaction. The method can select elements based on a user profile.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
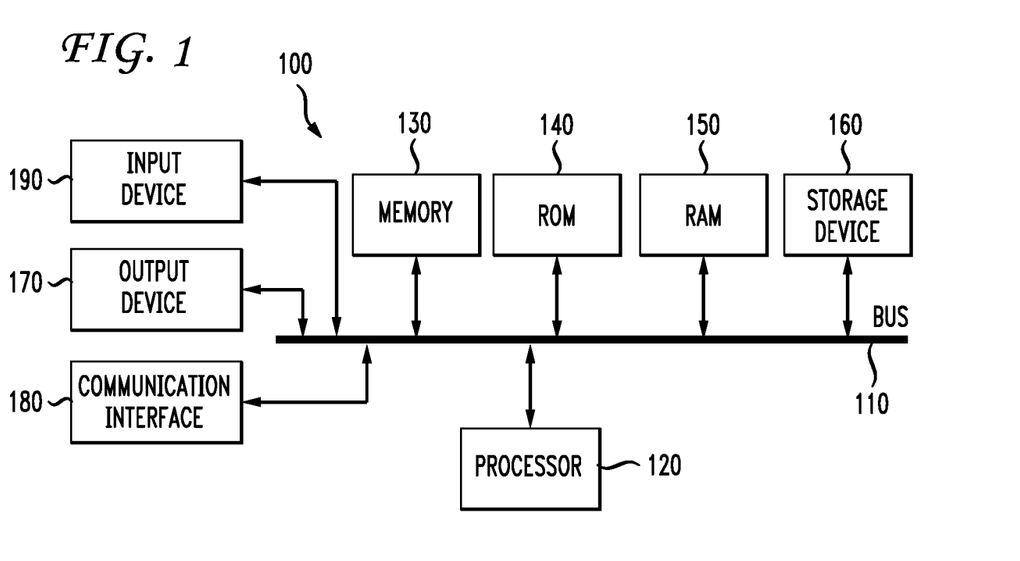
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. A STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
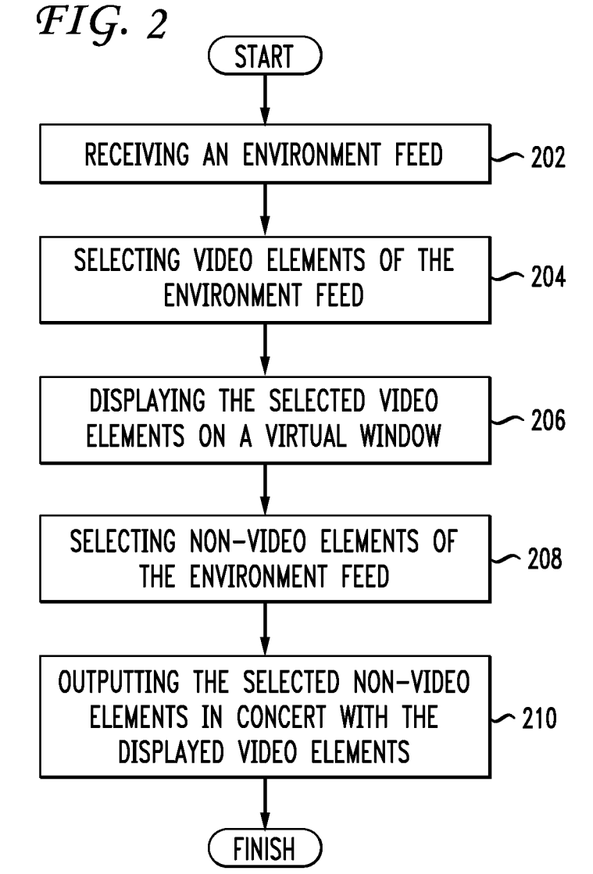
FIG. 2 illustrates an example method embodiment.

Having disclosed some elementary system components, the disclosure turns to the example method for creating and manipulating synthetic environments, as illustrated in FIG. 2. For simplicity, the method is discussed in terms of a system configured to practice the method. The system first receives an environment feed (202). An environment feed can include synthetic and natural elements. An environment feed is somewhat like a video feed of a conference or a meeting, but also includes extra-audiovisual elements. For example, an environment feed of a football game can include multiple video angles, sound recordings from multiple positions, smell, humidity, wind speed and direction, background noise, amount and color of ambient light, and so forth. In one aspect, environment feeds also include still images, such as family pictures, political ads, and movie posters. In one aspect, users pay for environment feeds at varying prices. For instance, an environment feed of the pink beaches in Bermuda can cost more than a feed of the New Jersey shore. Different feeds can cost different prices at different times. For example, environment feeds of New Orleans during Mardi Gras or Times Square at New Years Eve can cost more than at other times. In one aspect, an advertiser can pay the owner of a system to display advertiser-selected environment feeds, perhaps in high traffic areas.

The system selects video elements of the environment feed (204). The system can select elements that are all or part of an environment feed. The system can select a specific object or exclude a specific object from the feed. For example, in an environment feed of a golf course the system can select the visible golf course and exclude the highway in the distance behind the golf course. The system then displays the selected video elements on a virtual window in a window casing (206). A virtual window in a window casing can be an LCD or plasma screen in a panel mounted inside a wall. A virtual window appears to be a standard transparent window, but can display things other than what a standard window would show. The virtual window can be on the interior or exterior of a structure, vehicle, or building. An interior virtual window displays an image of what is or what appears to be the outside. An exterior virtual window displays an image of what is or what appears to be the inside. An interior and exterior virtual window can be incorporated into one unit. In the case of LCD panels that require a backlight, an interior and exterior virtual window can share a backlight element. When an environment feed includes multiple visual angles or perspectives, the system can coordinate multiple virtual windows in a single room for a visually consistent appearance. For instance, in a room with virtual windows to the north, south, and east, the system can display environment feeds originating from the same point, but recording different directions so a person who views the virtual windows sees a plausible place.

The system selects non-video elements of the environment feed (208) and outputs the selected non-video elements coordinated with the displayed video elements (210). In one aspect, the system retrieves a user profile and selects video and/or non-video elements of the environment feed based on the user profile. For example, if a user has an extremely sensitive sense of smell, that user's profile can indicate never to include smells. The system can coordinate output of these non-video elements with playback devices incorporated into the virtual window or in the vicinity of the virtual window. For example, the frame of the virtual window can include speakers, scent emitters, fans, humidifiers, dehumidifiers, and so forth. The system can coordinate with devices not incorporated in the virtual window, such as ceiling fans or standard room lighting. One example non-video element is ambient lighting. The system can coordinate the room lighting to darken, brighten, flash, or change colors to match the displayed environment feed.

In one aspect, the system can toggle virtual windows between displaying the selected elements and being transparent. Transparency can cover the entire surface of the virtual window or portions of the virtual window, allowing users to see a mix of virtual window elements and what is actually on the other side of the virtual window. The transparency can be complete, i.e. 100% transparent, or partial, i.e., 25% transparent.

Further, the system can alter one or more element of the environment feed over time. For example, if an environment feed depicts a tree, in spring the system displays the tree with leaf buds. As the summer progresses, the system displays the tree with branches full of green leaves. As autumn approaches, the system displays leaves changing color and falling to the ground. The system can alter elements on a seasonal, annual, monthly, daily, or hourly basis or at any other time increment. The system can also alter non-video elements over time.

In another aspect, the system tracks user motion and adapts the displayed selected elements on the virtual window based on the tracked user motion. The system can do this to provide the rendering depth and appearance of a real window as the user moves about the room. As the perspective and/or position of the user changes, what the user would see in a real window changes. The system updates the virtual window to imitate those changes. The system can respond to any user motion, large or small. One example of this is head tracking. The system can locate and track the position and/or orientation of a user's head in the room and adapt the display so the perspective displayed on the virtual window renders depth as a real window would. This effect can require a basic three dimensional modeling of the contents of the environment feed. The system can use cameras and/or distance sensors (otherwise known as range finders) to calculate the movement and position of a person (or her head). Some commonly used distance sensors are infrared sensors that use reflected light, triangulation based sensors, and ultrasonic sensors. The system can depend on some kind of reflector or transmitter carried or worn by users to detect their position and/or identity.

Figure 3:
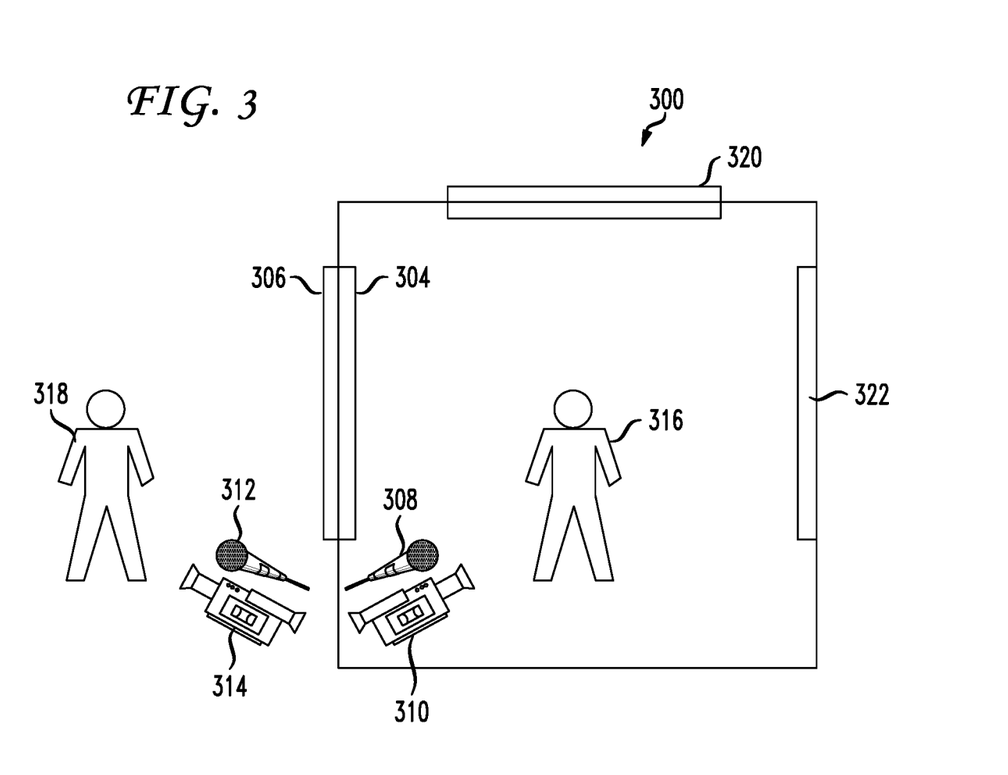
FIG. 3 illustrates an example configuration for virtual windows.

FIG. 3 illustrates an example configuration for virtual windows. This configuration 300 is exemplary. Other configurations exist. The room 300 has four walls. One side has an interior virtual window 304 and a corresponding exterior virtual window 306. Both the interior and the exterior virtual windows have corresponding microphones 308, 312 and cameras 310, 314. In addition to more traditional sensors such as microphones and cameras, the system can also include sensors and output targeted at different senses. For example, a wind sensor and a wind generator, a smell sensor and smell generator, or a temperature sensor and temperature generator. A user can individually disable or enable each of the various inputs completely or in degrees. In a situation where users purchase environment feeds, different subsets of the complete sensed environment can be priced differently. For example, a free environment feed can include only the visual portion of the feed. For an additional fee the environment feed can include sound, for another additional fee the environment feed can include smell, and so on. A viewer 316 on the inside of the room can see one image on the interior virtual window 304 while a viewer 318 on the outside of the room can see a different image on the exterior virtual window 306. A server can augment the video signal of the interior camera 308 with synthetic elements to display on the exterior virtual window 306, allowing the viewer 318 to see a modified version of what is behind the exterior virtual window 306, as if it were a real window. For instance, the server can modify the video signal to display people in the house even when no one is home. The server can modify the video signal to display a fireplace against the wall when there is none. Similarly, the interior virtual window 304 can display an environment feed of a far-away location or of the exterior camera 314. The server can augment video, synthesize elements for inserting into a video, or display a completely synthetic environment. For example, if the virtual window were a real window, the inside viewer 316 may see a dark alleyway, whereas the inside viewer 316 can see an environment feed of a forest, a glacier, a park, golf course, or other desirable location on the virtual window. A user can set up an environment feed of her house for display on a virtual window at work. The system can include other outputs than the visual aspect of a virtual window, such as vibration, sound, smell, tactile output, windiness, humidity, and temperature. The server for controlling the environment feed can be integrated as part of the virtual window, can be a locally connected module (wired or wireless) which coordinates the output at each virtual window, or the server can be a centralized network server which operates in the Internet or a computing cloud.

One side has a single display that operates as both an interior and an exterior virtual window 320. In this case, both the inside viewer 316 and the outside viewer 318 see the same image on the virtual window. The virtual window can simulate wooden blinds or a bug screen, for example, where parts of the virtual window are opaque and parts are transparent. The system can tint virtual windows entirely or partially to block sunlight or to prevent others from peeping inside the room.

One side has only an interior virtual window 322 which is hung on a wall like a painting. The system can coordinate this interior virtual window 322 with the other displays 320, 304. While the system could coordinate this interior virtual window 322 with the exterior virtual window 306, it may not make sense in this context because each targets different viewers. However, if the virtual window 320 is partially transparent and shows snow falling outside, the system can coordinate the other interior virtual windows 304, 322 by altering their feeds to include snow or other indications of cold weather. Other exterior weather and conditions can influence how the system modifies related environment feeds.

The system can index each addressable output device and their capabilities. The system can form groups of output devices to update and maintain in synchronization for output. Output devices can belong to one or more group. In this case, the system can assign groups different priority levels. In one aspect, the system only displays the environment feed associated with the highest priority group. In another aspect, the system blends environment feeds of different priorities where possible and possibly in proportion to their priority.

Figure 4:
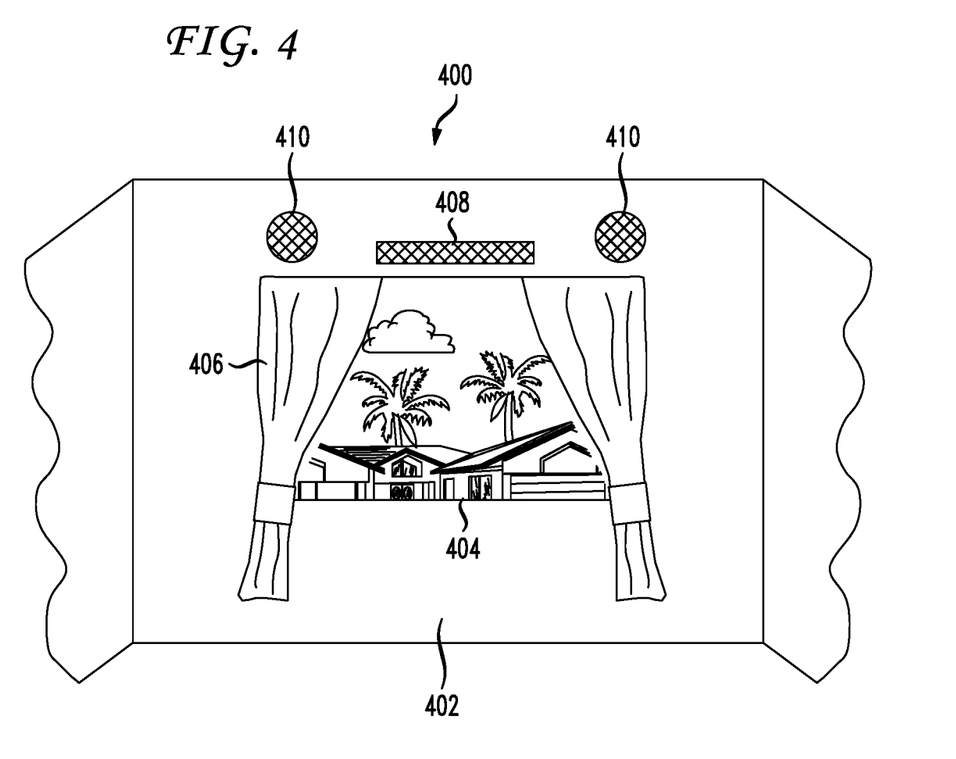
FIG. 4 illustrates a sample virtual window.

FIG. 4 illustrates a sample virtual window. The house 400 includes a wall 402 with a virtual window 404 in place of a normal window. The virtual window 404 can either be integrated into the wall 402 like a window frame or separate from the wall like a picture hanging on a wall. The virtual window 404 is on the interior side of the wall 402 and typically displays simulated views of what can be on the other side of the wall or augmented views of what actually is on the other side of the wall. A simulated view can be a grassy field with fluffy white clouds in the sky. An augmented view can be adding a rainbow to an existing outside view or showing leaves on the trees even after they have really fallen down, for example. A user can install any of the typical window dressings 406 such as blinds, curtains, or drapes in front of a virtual window so the virtual window does not appear unusual. A user can install or place auxiliary output devices, such as speakers 410, somewhere in close proximity to the virtual window. A user can install other input devices, such as a camera or microphone 408 to record one side of the virtual window for output on the opposite side. The system can use the video camera 408 to transform the virtual window into a mirror-like display so the user can see a reflection of him or her self and what is in the room. The system can include wireless headsets connected to the speakers to allow the user to experience and enjoy the sounds without disturbing others. The system can also incorporate other senses in similar ways.

Figure 5:
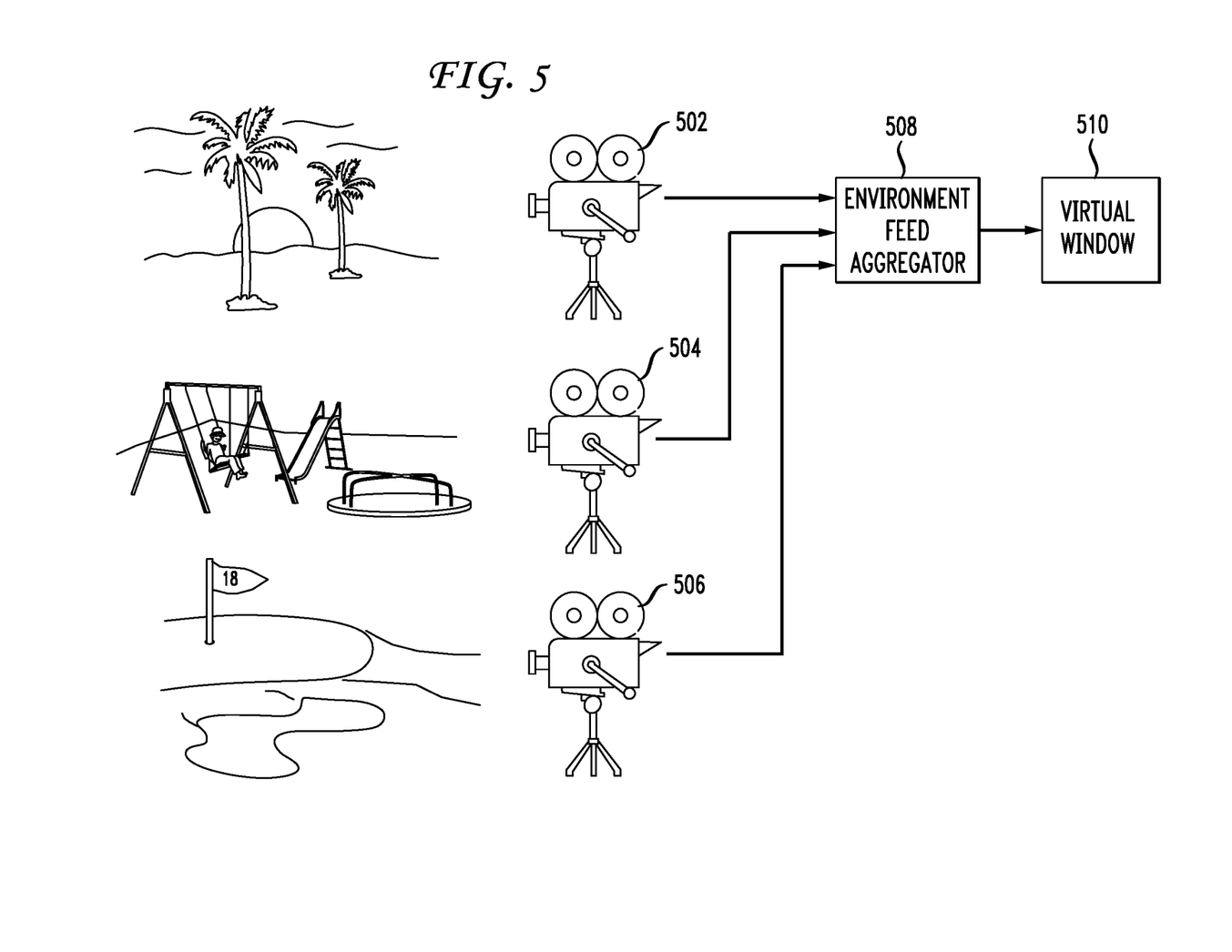
FIG. 5 illustrates an example environment feed aggregator.

FIG. 5 illustrates an example environment feed aggregator. Various sources 502, 504, 506 provide environmental feeds of different locations, such as a tropical island, a playground, or a golf course. Environmental feeds can include video, audio, smell, weather information, temperature, humidity, and so forth. An environment feed aggregator 508 gathers and stores these environmental feeds 502, 504, 506. The aggregator can be part of a system controlling virtual windows 510 or it can be separate. A system controlling windows can request or subscribe to environment feeds for individual virtual windows or sets of virtual windows. Environment feeds can include multiple channels of the same type of information, such as three different camera angles of the same location. The environment feed aggregator 508 can send and receive environment feeds via closed-circuit cameras, video over IP, stored video on a hard drive, and other formats. The aggregator 508 can provide environment feed subscription services, like Really Simply Syndication (RSS). The aggregator can pre-combine elements of different environment feeds to generate new feeds. Environment feeds can include partial information, such as only a smell, or only audio, or only a portion of a video which can be laid over an existing feed such as drapes or window shades.

People operating environment feeds in desirable or beautiful areas can sell or license their feeds to others. For example, a person in Tahiti can license their feed of the beach. An Indian reservation can sell their feed of the rim of the Grand Canyon. The International Space Station can offer for free their feed of the Earth from space to contributors or employees of the various space agencies while charging a fee for others. In the case of a feed that is from a different time zone, the system can time-delay the feed so the time of day shown in the feed matches the local time of day.

Figure 6:
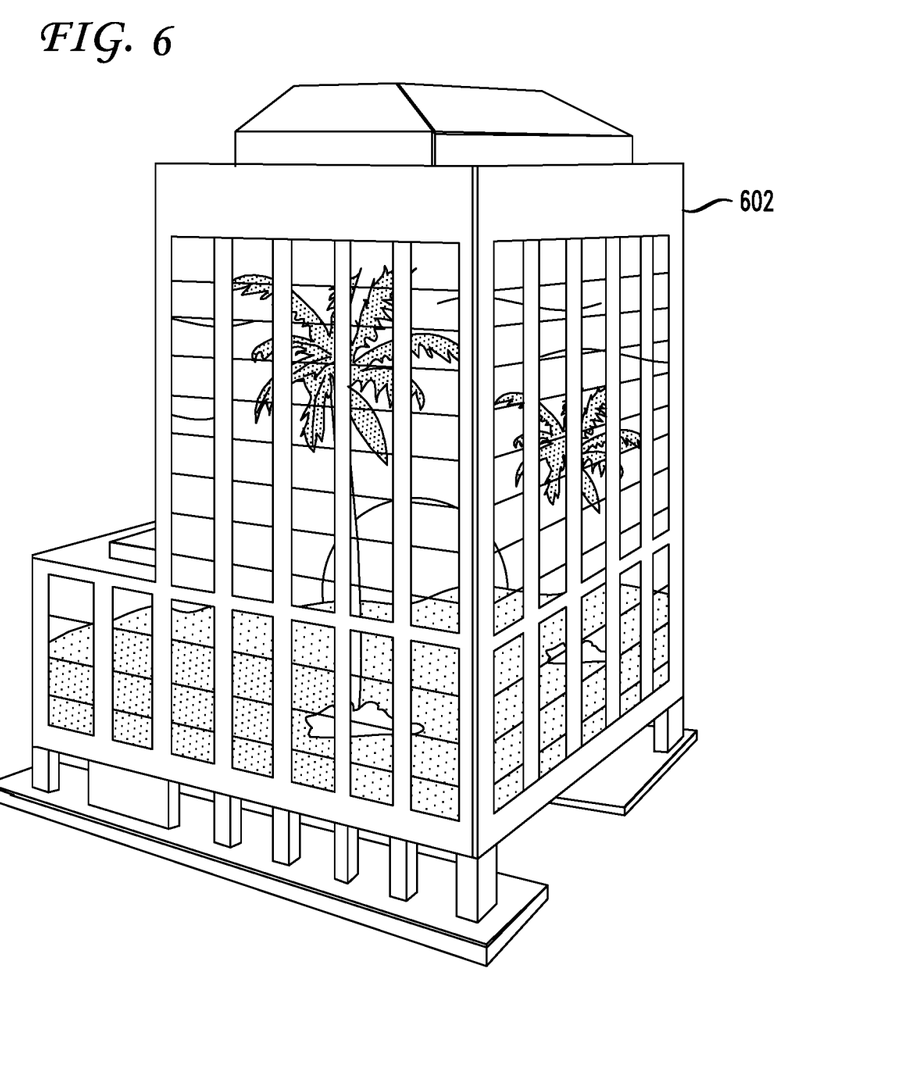
FIG. 6 illustrates a building with coordinated external virtual windows.

FIG. 6 illustrates a building with coordinated external virtual windows. A central server can coordinate the external display of multiple virtual windows. Multiple virtual windows can operate as a single, macro level display. For instance, a high-rise 602 with virtual windows can display a large image of a single environment feed. The system can configure the external virtual windows to display coordinated advertising material, essentially transforming the building into a large billboard advertisement. The external virtual windows can also display a texture similar to the surrounding building material in order to blend in and not appear to be a window.

Figure 7:
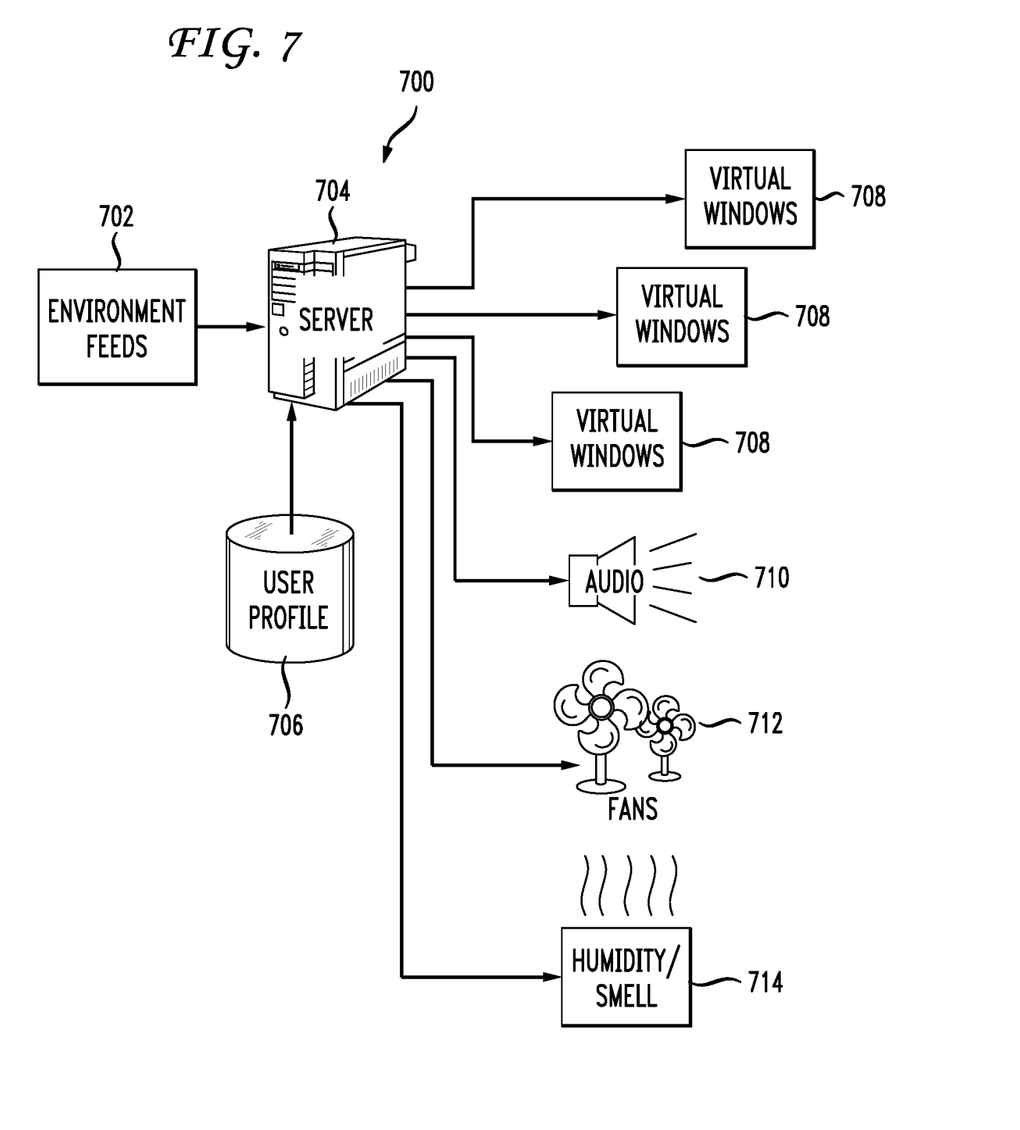
FIG. 7 illustrates a system for receiving environment feeds and coordinating their output.

FIG. 7 illustrates a system for receiving environment feeds and coordinating their output. The system 700 receives environment feeds 702 at a server 704. Environment feeds can come from remote places or can be local, such as a nearby camera or a camera integrated into the opposite side of a virtual window. The server 704 also retrieves a user profile 706 including user preferences and personalization information. The server selects one or more environment feeds 702 and assembles natural and synthetic portions together for output on one or more virtual windows 708. Environment feeds can also include non-visual outputs, such as audio 710, a fan 712 to create a breeze, and a humidity or smell 714 generator. The server 704 can control and coordinate each of these outputs to simulate a particular environment feed. One example environment feed is a tropical island. The server 704 can simulate a tropical island by displaying a blue, sunny sky, palm trees, and the beach in multiple virtual windows 708, playing the sound of a breeze and the ocean over speakers 710, turning on fans to provide an actual breeze in the room 712, and providing a slight humidity and the smell of salty sea air 714. The system can also add synthetic elements to the feed. For example, if the user has a database of family photographs or home videos at the beach, the system can insert or merge all or part of those elements into the virtual windows. The system can also incorporate purely synthetic elements as well, such as a three-dimensional model of a seagull flying in the sky. If the user wants to simulate the effect of being on a boat, the system can gently rock images in each window back and forth.

Figure 8:
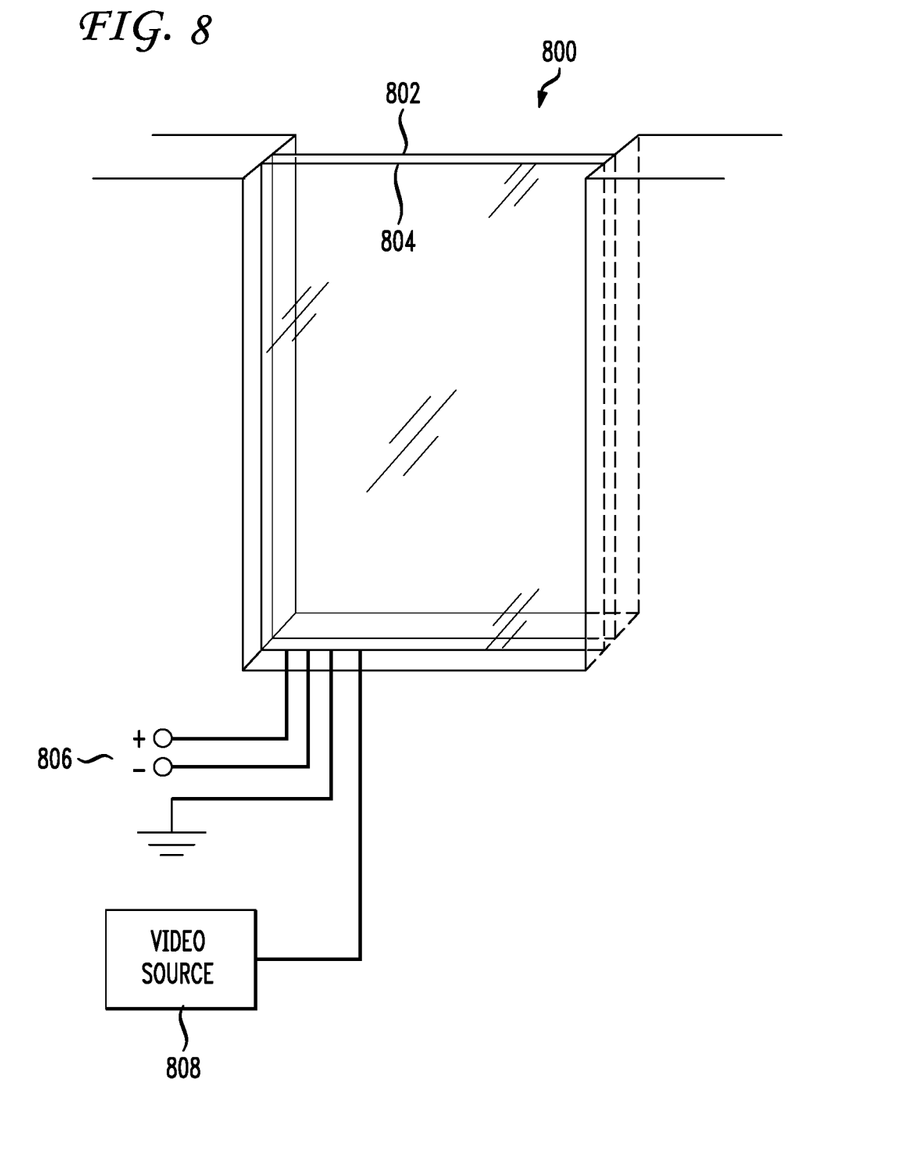
FIG. 8 illustrates an example snap-in liquid crystal display (LCD) virtual window panel.

FIG. 8 illustrates an example snap-in LCD virtual window panel. A wall 800 has a recessed section holding a virtual window panel in a manner similar to an actual window. Similar to a double-paned glass window, the virtual window panel has two faces 802, 804. One face 802 displays an interior image and one face 804 displays an exterior image. Additional layers can exist over the virtual window panel. For example, a glass or clear plastic panel can protect the virtual window panel. Drapes, an insect screen, or a lattice of wood (or faux wood) can partially obscure the virtual window panel to make it look more like an authentic window. A single, user-replaceable unit having two LCD virtual window panels and a shared backlight element can snap or latch in place. Panels can also be held in place magnetically. When a panel snaps in place, the window panel automatically connects with contacts for electricity 806 as well as a video source 808, such as an environment feed or a local feed server. The automatic connection can be similar to the electrical contacts on a video game cartridge, secure digital card, or a RAM module in a computer. In one aspect, rather than replacing an entire unit, users can replace just the LCD panels or the backlight element within the virtual window panel. In one aspect, a solar panel can provide all or some of the power to LCD panel and/or the backlight element. While LCD displays are discussed, other suitable display technology can be used as well, such as organic light emitting diode (OLED), plasma, digital light projection (DLP), and cathode ray tube (CRT) displays.

Figure 9A:
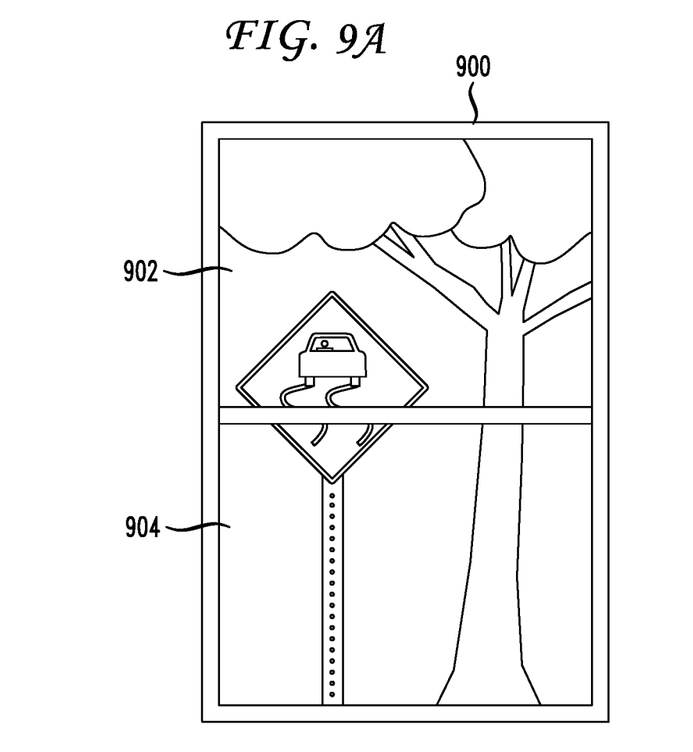
FIGS. 9A and 9B illustrate an example two-pane virtual window in an open and a closed position.
Figure 9B:
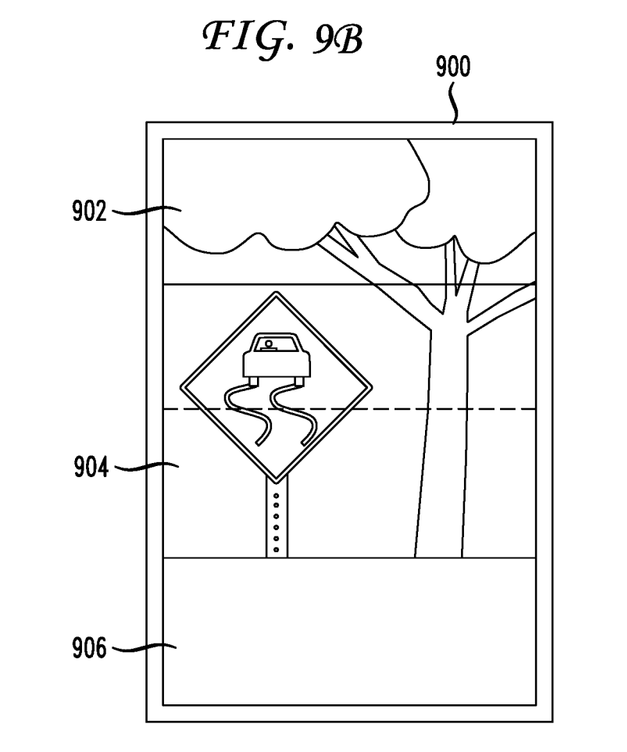

FIGS. 9A and 9B illustrate an example two-pane virtual window in an open and a closed position. Two or more virtual windows can operate in concert to show different portions of the same environment feed. One simple example of this is a two-pane virtual window 900 made up of two LCD panels, one on top 902 and one on bottom 904. Much like a real window, the bottom panel slides open to view what is behind the virtual window 906. As the bottom panel slides up, sensors detect the position of the bottom pane 904 in relation to the top pane 902 and the system adjusts the image on the bottom pane 904 to match what is on the top pane 902. The result is a smooth, uninterrupted image spanning both panes 902, 904 even though the bottom panel 904 is moved. The sensors for this can be in the panes themselves or in the wall or in a window sill. In one aspect, the user can indicate that when the window pane is open, the system disables the environment feed or makes it match what is behind the virtual window 906. Similarly, as one pane is closed, the system detects the position of the panes and smoothly updates the virtual windows to display a unified image across the two.

Figure 10:
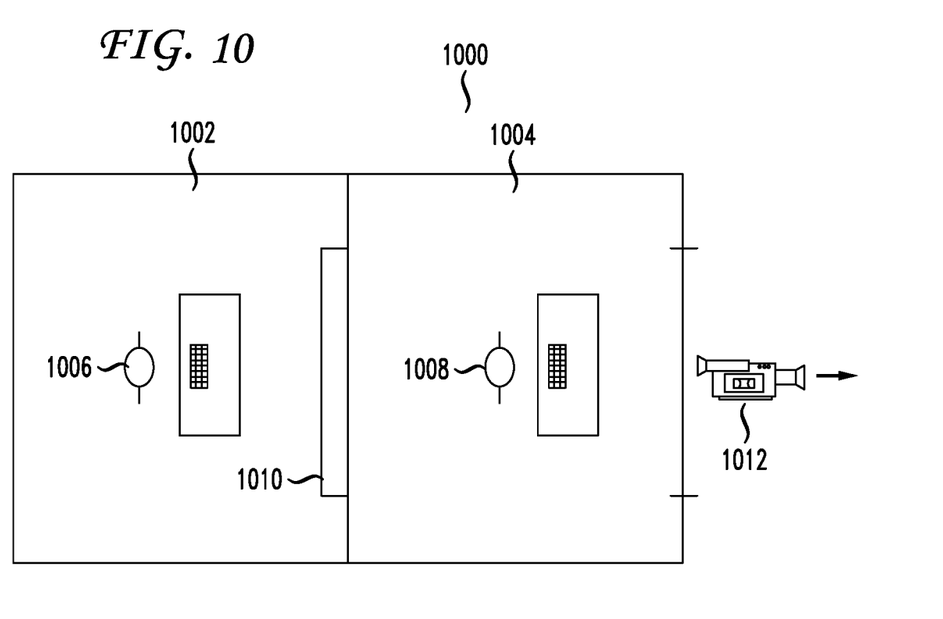
FIG. 10 illustrates an example application of a nearby environment feed.

FIG. 10 illustrates an example office building application of a nearby environment feed. In this example, an office building 1000 has two rooms. One room on the inside 1002 does not have an external wall and one room on the outside 1004 has an external wall with an outward facing window. The worker 1006 in the inside room 1002 cannot see outside. However, the worker 1008 in the outside room 1004 can see outside. A virtual window 1010 mounted on or in the wall can display a feed from a camera 1012 only a few meters away. The camera 1012 can be mounted just above or below the window of the outside room 1004 to display to the worker 1006 in the inside room 1002 substantially the same view as the worker 1008 in the outside room 1004. In this way, each office in a building can share the corner office benefit of a great view. The worker 1006 can select different external feeds for the virtual window 1010, such as feeds of the corporate headquarters, of a different office window, or of a golf course.

When workers stay late, the system can delay playback to "extend" the day to match the later hours. For example, an intermediate recording module, not shown, can record the view through the camera 1012 throughout the day. The system can calculate at what rate to extend playback to fill the late hours and play the recording back at a slower speed. In this way, if a worker stays until 7:30, the virtual window shows the environment feed more and more out of sync with the actual outside environment, but in sync with the worker's routine of seeing the sun go down just as he leaves the office. This technique can be particularly effective if the worker does not see any conflicting visual cues, such as a real window to the outside of the building.

In another embodiment, a virtual window can replace a wall panel or a ceiling panel. Instead of displaying an environmental feed of somewhere else or somewhere exotic, a virtual window can show a pattern simulating wallpaper, a ceiling tile, or even a fluorescent light panel. To aid in maintenance or diagnostics, a user can toggle the virtual window to show what is immediately behind it. For example, the virtual window can contain a camera which allows the virtual window to display the various duct work, plumbing, and wiring located behind a wall or in the plenum space above a ceiling. The same principle can be applied to things like computer cases or body panels on a car to allow for the virtual window or virtual panel to display one texture, image, or pattern and toggle to a view of what the panel covers. Such functionality allows for a quick glance at what is behind the panel, as if the panel were transparent or not there at all.

In another aspect where virtual windows include a camera to see what is behind the window, the system can allow users to remotely log in to the window to view the camera feed. For example, a user can log on remotely with a computer, remote control, or smart phone to a virtual window in the front of her house to remotely see what is happening there. The user can log in and view that feed from within the house or halfway around the world.

In one aspect, virtual environment feeds includes three-dimensional and/or formable displays which are either flexible or rigidly molded to a non-flat shape (i.e. circular, spherical, wavy, curved, ridged, bumpy, or otherwise contoured to the shape of a real or imaginary physical object). For instance, legs of a char can be made of or fitted with a curved, tubular virtual window. The chair leg virtual window can display a mahogany wood textured image for formal occasions and a simple white or beige textured image for other occasions. In another example, a large virtual window is placed underneath a clear plastic or glass kitchen countertop. As the kitchen owner's mood changes, she can change the virtual window texture to display things like running water, granite or marble countertop texture, or an environment feed of the children playing in the backyard. A user can display environment feeds of various places around the house and surrounding grounds to monitor children, for home security purposes, to know when guests are arriving, etc. The system can act as a surveillance system in this regard.

The system can overlay synthetic elements on top of any of these feeds, such as a television show, clock, weather forecast indicators, or other elements. In one aspect, users can interact with the countertop using speech, gestures, touch, plates, utensils, food, clapping, or other input. One such interaction is to toggle between environment feeds, such as between the front of the house to see when a pizza delivery person arrives and the backyard to see what the children are up to. In another aspect, one large or multiple small virtual windows can attach to a ceiling to simulate the sky, such as birds flying overhead, the movement of the sun, moon, stars, comets, clouds, airplanes, planets, and other airborne (or space borne) objects).

In one aspect, to conserve power and possibly the life of the virtual window elements, the system can communicate with or incorporate motion sensors. When the system detects a certain period of time with no motion, the system can turn off one or more virtual window or place it in a reduced power mode. The system can use different thresholds of motion sensitivity and time without motion depending on time of day, day of the week, or can be manually set by a user.

In one aspect where the system is connected to security sensors, the system can coordinate displays with detected break-ins or breaches. For example, if a burglar breaks in a house, the system can display images and play sounds on the interior and/or exterior facing virtual windows intended to frighten the burglar into retreating. One example is displaying on exterior windows an image of the homeowner with a shotgun or other menacing weapon. Another example is displaying on an exterior window a video of a large guard dog such as a Mastiff, German Shepherd, Pit Bull, or Rottweiler accompanied with loud, ferocious barking. Yet another example is displaying on interior virtual windows an image of a police car pulling up in the driveway with accompanying sirens and flashing lights. The system can adapt the images on the virtual windows to match the time of day, the weather, shadows, reflections, and other factors. When the security alarm is tripped, the system can take pictures of the intruder(s) and display them on the virtual windows with a text or spoken message that these pictures have been sent to the police and the police are coming quickly to investigate (whether that is true or not).

In another useful aspect, a system of multiple external virtual windows can connect with a fire alarm system. The fire alarm system detects a fire in a specific location or room and communicates that location to the system of virtual windows. To assist firefighters in finding the correct house, finding the fire within the house, or in locating persons inside the house, the system can display images on the external windows. For example, if the fire is in one part of the house, the system can display large flashing red images of fire on the nearest external windows. If a person is trapped in an upstairs room and cannot exit the burning house, the system can display images of a person or a message indicating a person is still in the house. Firefighters can then plan their rescue and firefighting efforts based on exterior window messages. Electricity may or may not be available from the main household power lines during a fire. Virtual windows can include a limited self-contained or local power source independent of the main household power, such as a battery backup, a solar panel, or a hand crank.

Virtual windows can display seasonal decorations. For example, exterior windows can display blinking red and green lights at Christmas time, spider webs and pumpkins at Halloween, or flag banners at the Fourth of July. Interior windows can augment the actual outside view with snow at winter time, a star in the eastern sky at Christmas time, wandering trick-or-treaters in costume on Halloween, or fireworks on the Fourth of July. The system can accompany any of these variations with appropriate sounds and/or other sensory outputs, such as vibration, smell, wind, or humidity. In a slightly more detailed variation, exterior windows can show a view of the inside of the house at Christmas time which dynamically changes. For example, a Yule log burning in the fireplace can burn down throughout the course of the evening. Or, over a longer period of time, the window can display a Christmas tree. As days pass and Christmas gets closer, the window can display the Christmas tree with more decorations, with more presents underneath it, etc. The window can tweak the tree's appearance to droop as it stands in the house and can even show needles piling up under the tree. On Christmas morning, the virtual display can show people opening presents and playing with toys. After Christmas, the virtual display can show the Christmas tree turning brown, decorations falling down, wrapping paper all over the floor, and other post-Christmas images. These actions and their timing can be user-customizable.

During election times, a user can set the virtual windows to display political campaign materials in a manner similar to bumper stickers or lawn signs. In one aspect, the system can include a database of local sound and advertising ordinances. The system can warn users if their desired actions would violate sound and/or advertising ordinances.

In one embodiment, virtual windows can toggle between being transparent (thereby functioning as an actual window would) and displaying an image or video. Virtual windows can be transparent in sections, such as a simulation of frost in the corners of the window. The virtual windows can provide partial transparency to provide some amount of shade, similar to a tinted window. The system can maintain a certain level of sunlight in the room using dynamically tinting, partially transparent virtual window.

Users can opt to display advertisements on virtual windows facing the exterior. Advertisements can be overlaid on top of a virtual window display, fill an entire virtual window, or can span multiple coordinated virtual windows. Homeowners can select the types of advertisements. For example, a single male may not want his house to show advertisements for lipstick or Hannah Montana. He can opt for advertisements for products he favors such as the NFL or a Hummer H1. Another homeowner can select the highest-paying advertisements regardless of content. Homeowners can indicate the content, amount, duration, timing, and placement of advertisements on their external and/or internal virtual windows.

In one embodiment, virtual windows include or are connected to sensors which detect the proximity of known individuals. The system can display different views based on who is nearby. One way to track individuals is by cell phone signals or radio frequency identification (RFID). The system can also transform exterior virtual windows on structures like homes or businesses into billboards to display targeted advertising to people driving by. For example, the system can detect a person approaching the house. The system retrieves and displays advertisements on exterior virtual windows based on the preferences and interests of the person driving by. After the person drives past the house, the system resumes displaying the previous environment feed.

Homeowners can choose to display on exterior windows images of the inside of their house with everything neat, clean, and in order, when in fact the house is dirty and messy on the inside. Alternatively, homeowners can show their family sitting down to watch television when they are away to give the appearance that someone is home. In order to convincingly portray this appearance, the system can modify a prerecorded video feed to adjust clocks to the proper time, to display current television show programming on the television in the image, and so forth. The virtual windows can display natural elements, synthetic elements, or a combination of natural and synthetic elements. Exterior virtual windows can display to outsiders images of a clean and neat house with expensive, luxurious furniture and architecture which is not actually on the inside of the house. The system can personalize virtual windows based on proximity of persons inside or outside the building. For example, the system can identify residents currently inside the house and dynamically change the views based on their profile or tastes. The system can identify people using face recognition/detection, speaker identification, RFID or other wireless tracking signals from portable electronic devices, etc. The system can identify unrecognized individuals and display environment feeds selected by the homeowner for unfamiliar people.

A set of virtual windows can coordinate displays and timing to assist graveyard shift workers to adjust to working at night by tricking their bodies into thinking it is daytime at night and nighttime during the day. Similarly, virtual windows can gradually shift their timing over several days to help travelers ease the adverse effects of jet lag.

In one aspect, the system controlling virtual windows connects with a home theater. As the home theater displays a movie or television show, the system can adjust the interior virtual windows to reflect the weather, surroundings, and ambiance of what the home theater is displaying. For example, if the home theater is showing the cantina scene in the original 1977 Star Wars movie, the system can synthesize a dark, smoky, alien-filled bar on Tatooine to display on the virtual window. The system can generate an entirely synthetic display for the virtual window, or the system can use clips, pieces, and other media from Star Wars to generate the appropriate output on the virtual window. In another example, the user is playing an Incredible Hulk video game on the home theater. The system can extract portions of the Incredible Hulk movie to display on the virtual window to round out the media atmosphere in the room. This system can extend this concept to the external windows as well. For instance, external windows can display to people outside what movie you are watching or what game you are playing. This aspect of the invention provides some aspects of a drive-in theater, but on windows or walls of a house rather than one large projection screen.

The system can include a module to transcodes environment feeds to fit the desired output. Virtual windows can be of virtually any resolution and indeed are likely to occur in varying resolutions according to size of the virtual window, cost, viewing distance, and other factors. The system can convert a very high resolution environment feed down to a lower bit rate or to a lower resolution depending on network needs or output device capabilities. Similarly, the system can apply a smoothing algorithm to scale small video or photos to a higher resolution without blocky resolution artifacts. The system can adapt 5.1 surround sound to stereo sound if the output device does not support full channel surround sound. In case the environment feed is stored or encoded in a format which the virtual window cannot recognize, the system can stream or convert the environment feed to a recognizable format for the virtual window.

In one embodiment, external virtual windows are subject to some level of community control. For instance, neighbors can provide feedback or input to shut down or change the environment feed of a virtual window that outputs offensive, obscene, or questionable content. Neighbors can send feedback to the system controlling the exterior virtual window via email, Short Message Service (SMS), remote control, and other ways.

In another embodiment, virtual windows and environment feeds can be part of virtual vacations. Virtual vacation systems using virtual windows can be implemented as part of a house or as a service, such as a spa. For example, a person can visit a virtual vacation salon where the user can pay a fee per hour to sit on a balcony virtually overlooking the Mediterranean and reading a book. A person in Arkansas can use virtual windows and environment feeds to make the inside of their house look and feel like a ski lodge in Colorado. The costs associated with these feeds can be based on desirability, demand, expense in recreating the environment feed, number of sensory elements required for the feed, and so forth.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, data structures, components, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to internal and external windows of structures and vehicles as well as other surfaces where dynamic virtual displays are desired. Those skilled in the art will readily recognize various modifications and changes that may be made to the present invention without following the example embodiments and applications illustrated and described herein, and without departing from the true spirit and scope of the present invention.

We claim:

1. A method comprising:
presenting on a device a first composite image that presents a first relative relationship between a first image and a second image according to a first view by a user of the first composite image from a first position, and wherein neither the first image nor the second image is an image of the user; and
after presenting the first composite image, presenting a second composite image that is configured based on a second view by the user of the second composite image from a second position, wherein the second composite image comprises a modification of the first image and the second image based on the user moving from the first position to the second position, wherein the second composite image comprises data associated with at least one of: a smell element, a humidity element, a temperature element, and a wind element of at least one of: the first image and the second image.

2. The method of claim 1, wherein the second image comprises synthetic and natural components.

3. The method of claim 1, wherein the second image further comprises data associated with a sound element.

4. The method of claim 1, further comprising:
receiving a user profile of the user; and
selecting a video element and a non-video element of the second image based on the user profile.

5. The method of claim 4, wherein the selecting of the video element and the non-video element of the second image is further based on an advertiser.

6. The method of claim 1, further comprising:
coordinating the presenting of the second composite image with a third image.

7. A system comprising:
a processor; and
a computer-readable storage medium having instructions stored which, when executed by the processor, cause the processor to perform operations, the operations comprising:
presenting on a device a first composite image that presents a first relative relationship between a first image and a second image according to a first view by a user of the first composite image from a first position, and wherein neither the first image nor the second image is an image of the user; and
after presenting the first composite image, presenting a second composite image that is configured based on a second view by the user of the second composite image from a second position, wherein the second composite image comprises a modification of the first image and the second image based on the user moving from the first position to the second position, wherein the second composite image comprises data associated with at least one of: a smell element, a humidity element, a temperature element, and a wind element of at least one of: the first image and the second image.

8. The system of claim 7, wherein the second image comprises synthetic and natural components.

9. The system of claim 7, wherein the second image further comprises data associated with a sound element.

10. The system of claim 7, wherein the computer-readable storage medium stores additional instructions which, when executed by the processor, cause the processor to perform operations further comprising:
receiving a user profile of the user; and
selecting a video element and a non-video element of the second image based on the user profile.

11. The system of claim 10, wherein the selecting of the video element and the non-video element of the second image is further based on an advertiser.

12. The system of claim 7, wherein the computer-readable storage medium stores additional instructions which, when executed by the processor, cause the processor to perform operations further comprising:
coordinating the presenting of the second composite image with a third image.

13. A computer-readable storage device having instructions stored which, when executed by a computing device, cause the computing device to perform operations, the operations comprising:
presenting on a device a first composite image the presents a first relative relationship between a first image and a second image according to a first view by a user of the first composite image from a first position, and wherein neither the first image nor the second image is an image of the user; and
after presenting the first composite image, presenting a second composite image that is configured based on a second view by the user of the second composite image from a second position, wherein the second composite image comprises a modification of the first image and the second image based on the user moving from the first position to the second position, wherein the second composite image comprises data associated with at least one of: a smell element, a humidity element, a temperature element, and a wind element of at least one of: the first image and the second image.

14. The computer-readable storage device of claim 13, wherein the second image comprises synthetic and natural components.

15. The computer-readable storage device of claim 13, wherein the second image further comprises data associated with a sound element.

16. The computer-readable storage device of claim 13, wherein the computer-readable storage device stores additional instructions which, when executed by the computing device, cause the computing device to perform operations further comprising:
receiving a user profile of the user; and
selecting a video element and a non-video element of the second image based on the user profile.

17. The computer-readable storage device of claim 16, wherein the selecting of the video element and the non-video element is further based on an advertiser.

18. The computer-readable storage device of claim 13, wherein the computer-readable storage device stores additional instructions which, when executed by the computing device, cause the computing device to perform operations further comprising:
coordinating the presenting of the second composite image with a third image.

19. The method of claim 2, wherein the synthetic components include at least one object that is not present in the first image or the second image.

20. The method of claim 1, wherein the presenting the second composite image comprises slowing a playback of the second composite image to synchronize the playback with a routine of the user.

* * * * *